United States Patent [19]
Montgomery et al.

[11] Patent Number: 5,444,642
[45] Date of Patent: Aug. 22, 1995

[54] COMPUTER SYSTEM FOR MONITORING EVENTS AND WHICH IS CAPABLE OF AUTOMATICALLY CONFIGURING ITSELF RESPONSIVE TO CHANGES IN SYSTEM HARDWARE

[75] Inventors: Peter Montgomery, Owen Sound; Don Becker, Tara; Cathy Robins, Owen Sound; Mike Slack, Owen Sound; Tim Lee, Owen Sound; Bill Oliver, Tara, all of Canada

[73] Assignee: General Signal Corporation, Stamford, Conn.

[21] Appl. No.: 199,977

[22] Filed: May 7, 1991

Related U.S. Application Data

[63] Continuation of Ser. No. 696,496, May 7, 1991, abandoned.

[51] Int. Cl.$^6$ .................. G06F 13/00; G06F 7/02
[52] U.S. Cl. ..................... 364/550; 395/700; 364/921.8; 364/949.4; 364/DIG. 2
[58] Field of Search ............ 395/700; 371/11.1, 16.1, 371/16.5; 340/506, 514, 518, 525, 577, 584; 364/221.7, 264, 267.4, 267.5, 267.9, 550, 557, 571.03, 921.8, 949.4

[56] References Cited

U.S. PATENT DOCUMENTS

| | | | |
|---|---|---|---|
| 4,545,011 | 10/1985 | Lyon et al. | 395/200 |
| 4,583,170 | 4/1986 | Carlin et al. | 364/420 |
| 4,589,063 | 5/1986 | Shah et al. | 395/275 |
| 4,649,514 | 3/1987 | Berger | 364/900 |
| 4,688,183 | 8/1987 | Carll et al. | 364/554 |
| 5,014,193 | 5/1991 | Garner et al. | 395/275 |
| 5,038,320 | 8/1991 | Heath et al. | 395/275 |
| 5,101,495 | 3/1992 | Yukawa | 395/700 |
| 5,109,484 | 4/1992 | Hughes et al. | 395/200 |
| 5,121,500 | 6/1992 | Arlington et al. | 395/750 |
| 5,170,472 | 12/1992 | Cwiakala et al. | 395/275 |
| 5,175,800 | 12/1992 | Galis et al. | 395/51 |
| 5,247,682 | 9/1993 | Kondou et al. | 395/700 |
| 5,257,368 | 10/1993 | Benson et al. | 395/700 |
| 5,257,387 | 10/1993 | Richek et al. | 395/700 |

*Primary Examiner*—Kevin A. Kriess
*Assistant Examiner*—Dennis M. Butler
*Attorney, Agent, or Firm*—Ohlandt, Greeley & Ruggiero

[57] ABSTRACT

A system for monitoring events which is capable of automatically configuring itself responsive to changes in system hardware comprising: a plurality of input circuits for detecting events and a plurality of output circuits for indicating the presence of the events; a computer means, including a microcontroller connected to the input circuits for two-way communication with the input circuits and further connected to the output circuits; a front panel and means at the front panel for further indicating the events; and means within the computer means for automatically configuring the system responsive to changes in system hardware.

2 Claims, 4 Drawing Sheets

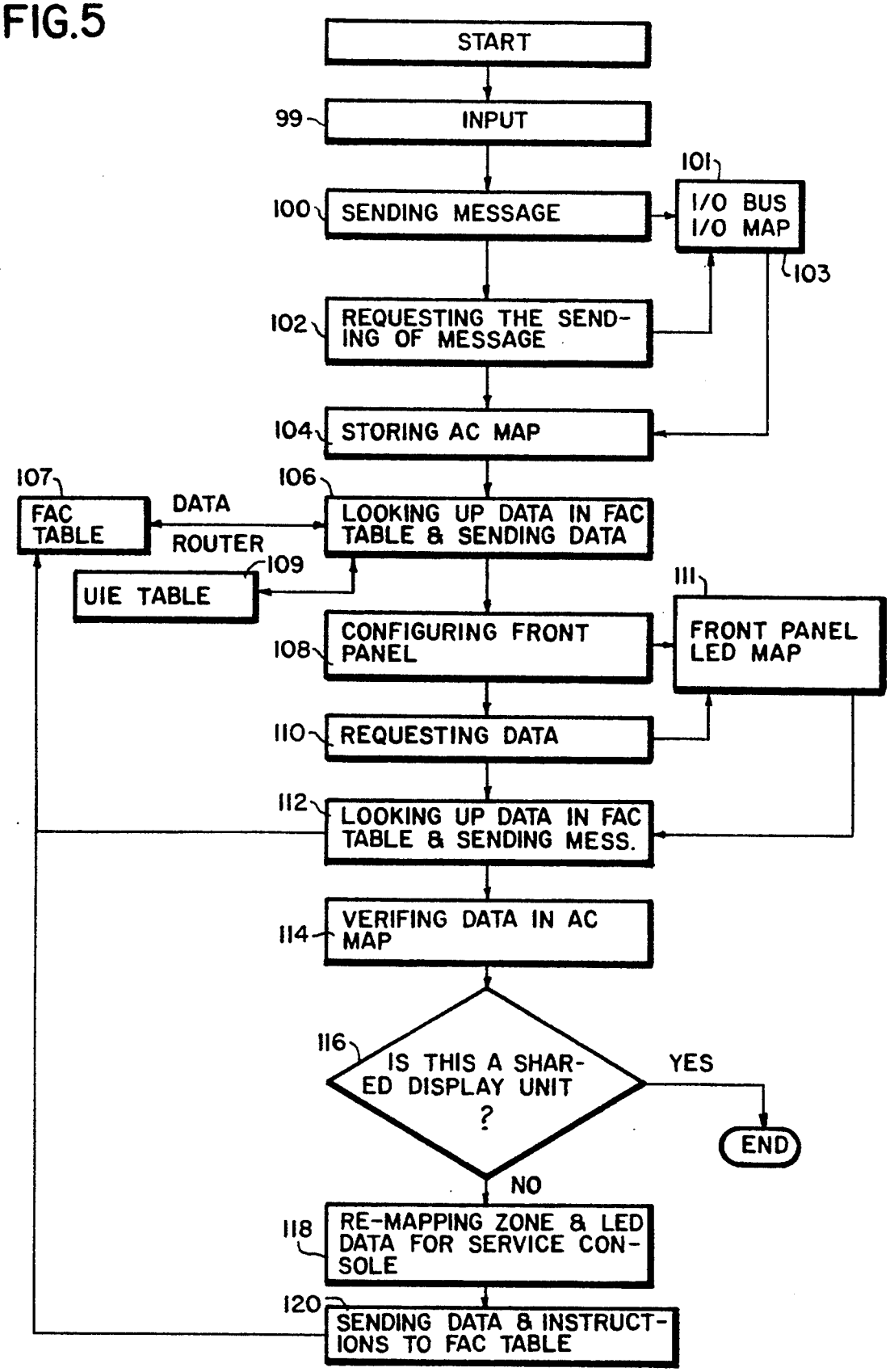

COMPUTER SYSTEM FOR MONITORING EVENTS AND WHICH IS CAPABLE OF AUTOMATICALLY CONFIGURING ITSELF RESPONSIVE TO CHANGES IN SYSTEM HARDWARE

This is a continuation of application Ser. No. 07/696,496, filed on May 7, 1991 now abandoned.

The present invention relates to a novel means for automatically configuring a system, e.g., an integrated fire alarm system, such that the system understands when the hardware on the system is changed and provides the correct processing for it. This novel means for automatically configuring a system is sometimes referred to as an autoconfigurator. The autoconfigurator is capable of identifying what hardware is on the system and from that sends messages to other units to help them create the programming necessary to communicate with and respond to the various units.

BACKGROUND OF THE INVENTION

One of the major design goals for alarm systems is to help minimize product development time as much as possible by standardizing the software and hardware used in various systems. The updating of existing systems by replacing modules, incorporating additional modules, or reprogramming the system, is extremely time consuming and subject to human error.

When modules are replaced or additional units are added to conventional systems or the system is reprogrammed, an operator normally has to utilize a laptop, or other computer, or an EPROM programmer to specifically indicate what hardware modules are on the system and how they should be processed. That is, the Operator or service personnel after hooking up all the hardware, such as modules, or reprogramming the system, would then be required to access the system software and instruct the system as to what has been replaced, modified or added to the system.

It would be highly desirable to design a system wherein manual reprocessing of the system is avoided subsequent to the replacement, modification or addition of hardware or reprogramming of the system. A system which can monitor events and is capable of automatically configuring itself responsive to changes in system hardware to help maximize product flexibility, ease of programming, both in the field and in a factory, and ease of service by service personnel, as well as to maximize product reliability and life safety, would also be extremely desirable.

The present inventors have developed a novel system for monitoring events and which is capable of automatically configuring itself responsive to changes in system hardware and software A primary object of the present invention is to provide a computer means having a means, in the form of an autoconfigurator, which interprets, i.e., it takes information or data, from all the programming units that identify what hardware is on the system, and from that sends messages to other programming units to help them create the programming necessary to respond to a changed situation. This autoconfigurator gathers information from lower programming units of a system, processes the information and sends it to other units, and configures those other units. Furthermore, the autoconfigurator is also capable of sending information not only to units forming part of the programming, but also to product layer units, which provide product features and operations, as will be explained.

Another object is to provide an autoconfigurator which drastically reduces the amount of programming that an operator or service personnel would have to provide on an a arm system subsequent to hardware or software changes. Most importantly, the autoconfigurator of the present invention eliminates the common errors which often occur during manual configuration of the system.

The present invention also provides many additional advantages which shall become apparent as described below.

SUMMARY OF THE INVENTION

A system for monitoring fire alarm events and which is capable of automatically configuring itself responsive to changes in system hardware comprising: a plurality of input circuits for detecting and responding to events, and a plurality of output circuits for indicating the presence of said events; a plurality of I/O modules of various types, connected to the respective input and output circuits for monitoring said fire alarm events; an I/O bus connected to said modules by said input and output circuits; a computer means for responding to monitored events, including means for storing internal programming, and a microcontroller connected to said computer means, and to said input circuits for two-way communication with said input circuits, and further connected to said output circuits; a front panel connected in said system, and means at said front panel for further indicating said events; and means, within said computer means, for automatically configuring the system responsive to changes in system hardware, including means, for ensuring that the internal programming is updated to understand the changed hardware and to provide the correct processing for the system hardware, said means for automatically configuring the system including: means for receiving inputs relating to the number of modules in the system; means for sending messages to the I/O bus and instructing the I/O bus to compare the actual number of modules and their location against the previously known information concerning modules; means for receiving message from the I/O bus relating to module types connected thereto and for developing an I/O map of all the modules on the I/O bus; means for storing the I/O map as an autoconfiguring map, the autoconfiguring map containing information relating to module addresses and module types; means for looking up data from tables containing information relating to the module types.

The means for automatically configuring the system responsive to changes in system hardware further comprises: means for sending a message to an I/O bus and I/O map; means for storing data from an I/O bus in an autoconfiguring (AC) map; means for configuring the front panel LEDs of the system; means for verifying data in the autoconfiguring map; and means for re-mapping zone and LED data for a service console.

It is preferable that an open system architecture be adopted for the computer means such that the programming scheme, seen in FIG. 1, includes an application layer, a product layer, and a platform layer, the last layer being further subdivided (FIG. 2) into an executive layer, a kernel layer, and a physical layer, whereby the autoconfiguration operation is essentially controlled by these layers.

The application layer contains system software which defines the feature selections, and operations that are used in the system. The product layer contains system software which defines various system operations; in one implementation, for example, standard fire alarm system features. The platform layer contains system software which relates directly with the system resources, e.g., hardware, i.e., which interfaces with input/output circuits, front panel lights and switches, remote annunciators, LEDs, and the like, as well as software, such as the operating system, supervisor, etc.

It will be noted that the platform layer is subdivided, as seen in FIG. 2, into an executive layer, a kernel layer, and a physical layer. The executive layer of the platform layer contains the programming which directs certain required operational steps, thereby constituting means for controlling the way the system will respond to various inputs and what outputs will be controlled in the system. The executive layer comprises a timed events portion or unit, correlation engines, history logger and autoconfigurator. The correlation engines contain the programming which directs certain other operational steps, thereby constituting means for interpreting the product layer code which identifies how the system will operate in response to an alarm, what signals will be turned on, or what relays will be activated.

The kernel layer contains standard software system services which monitor or control the system, and comprises a data router, an operating system, a supervisor and diagnostics.

The physical layer contains all the software which essentially drives the system hardware and interfaces with the system hardware, and comprises, among other items, an I/O bus driver, a front panel driver, and a remote annunciator driver, the term "driver" here being used in the programming sense.

The autoconfigurator provides the automatic configuration operation by itself but can, if desired, be interfaced with a laptop programmer, as will be explained. The autoconfigurator acts, and includes a means, to ensure that when the system is reprogrammed or when the system hardware is changed, the internal programming is updated to understand the system hardware and provide the correct processing for the system hardware.

The preferred autoconfigurator further comprises: means for receiving inputs relating to the number of modules of the system; means for sending messages to an I/O bus and instructing the I/O bus to compare the actual number of modules against the number of modules which the operator inputs into the system via either a LCD/keypad unit or a service console; means for receiving messages from the I/O bus relating to module types connected thereto and developing an I/O map of all the modules on the I/O bus; means for storing the I/O map as an autoconfiguring (AC) map, the AC map containing information relating to module addresses and module types; means for looking up data from tables containing information relating to the module types, processing tables from the information on the AC map, and sending data from the correlation engine tables to other units of the open system architecture (e.g., by means of a data router); means for configuring a front panel LED map of the system from the data from the FAC and UIE tables; means for requesting data from the front panel LED map; means for looking up data from the front panel LED map, and sending messages to the correlation engine table; and means for verifying data in the AC map.

When input is received from a service console, rather than a shared display, the autoconfigurator also includes the following: means for remapping zone data and LED data for the service console; and means for sending LED data and instructions to the correlation engine table.

Other and further objects, advantages and features of the present invention will be understood by reference to the following specification in conjunction with the annexed drawings, wherein like parts have been given like numbers.

BRIEF DESCRIPTION OF THE DRAWING

FIG. 5 is flowchart depicting the operational steps performed by the computer in accordance with the means for automatically configuring the system according to the present invention.

DESCRIPTION OF THE PREFERRED EMBODIMENTS

A fire alarm system in accordance with a preferred embodiment of the present invention includes a multiple zone fire alarm panel, and is capable of being implemented under an open system architecture. This open system architecture provides the capability for the system to be extremely flexible, such that the system may be extended and/or modified completely in the field within the capabilities of the basic system hardware and drivers. The term "configured" as used herein refers to the many system features which are field configurable on the product, including auxiliary correlations, front panel zone LED assignments, assignment of generic I/O modules to specific module types and addresses, etc.

Various I/O modules, which may be connected to an I/O bus to be described, provide additional input or output circuits to the alarm system. These modules, for example, are generic input modules, generic supervised output modules, generic unsupervised output modules, generic FDR (Fire Department Relay) modules, coil terminated relay modules, adder power supply modules, audio tone generators, zoned paging modules, telephone modules, master telephone modules and loop controllers. All modules interface to the system via the I/O bus. Dip switches are provided on each module to set the I/O bus address, to identify the circuit type.

When the autoconfigurator is selected from the device programming menu, either via the shared display unit or a service console, it causes the I/O bus driver to interrogate all modules on the I/O bus and identifies their type. Loop controllers (FIG. 3) are simply another I/O module on the I/O bus and so they are also autoconfigured with this command. Modules no longer on the I/O bus are deleted along with all their programming.

For example, after a service person installs additional modules and connects the field wiring the autoconfigurator unit 56 (FIG. 2) is activated from either a service console or unit shown of the fire alarm system. The autoconfigurator thereafter reads the I/O bus, the front panel LEDs and so on. It identifies the number of LEDs, the number of modules, module types and provides full default programming for the alarm system with no further information being required from the service person.

The autoconfigurator is processed by one of the correlation engines. It ensures that when the system is reprogrammed or when the hardware is changed on the system, the internal programming is updated to understand the new hardware and provide the correct processing for it.

The basic flow of the autoconfigurator 56 is to gather information from lower units, process the information, send it to the other units, and configure the other units. That is, the autoconfigurator is capable of verifying and passing information not only to the lower units, but also to the product layer units.

Figure 3:
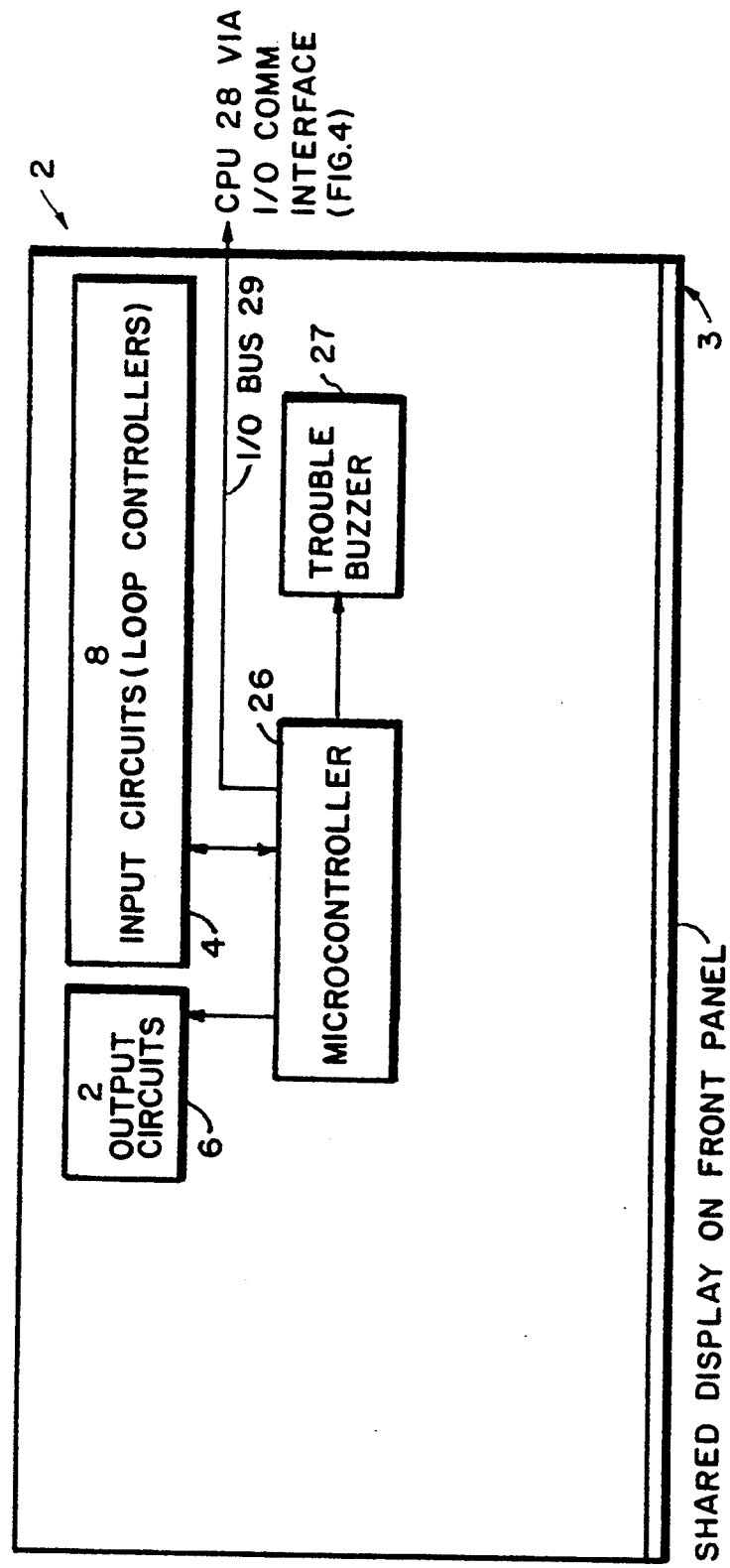
FIG. 3 is a schematic representation of the basic system in which the present invention is incorporated.

The present invention can further be explained by referring to other figures of the drawings; first of all, by referring to FIG. 3 which is a schematic representation of the basic system circuit board according to the present invention. Basic system board 2 is shown, for example, as including a front panel 3 on which are mounted a variety of indicating devices (not seen) such as LEDs and the like. Further provided on board 2 are eight generic input circuits 4, including detector loops (not shown); two generic supervised output circuits 6, and a coarse regulated signals supply 22. Further provided is a microcontroller 26 connected to the input and output circuits; also, an input/out bus 29 for the purpose of connecting from a central processing unit (CPU) 28 (FIG. 4) to the microcontroller 26.

Figure 1:
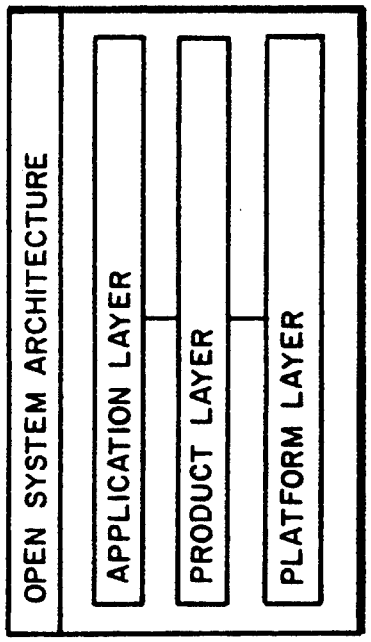
FIG. 1 is a block diagram depicting the overall open system architecture in which the present invention is operative.

FIG. 1 is a diagram of an open system architecture, as already briefly noted, having a programming scheme which includes an application layer, product layer and platform layer. In accordance with this layered architecture, the software itself has a defined function that would tend to be common to all products and all conceivable product lines. It accomplishes various goals, i.e., it helps minimize product development time and standardizes the software and hardware used in different fire alarm and life safety systems.

The platform layer provides the system hardware and software which interfaces to I/O circuits, the front panel lights and switches, the remote annunciator, LEDs and so on. The product layer then contains all the software which defines various fire alarm operations. The application layer defines the feature selections and the signal and operations that are used in a particular installation.

Figure 2:
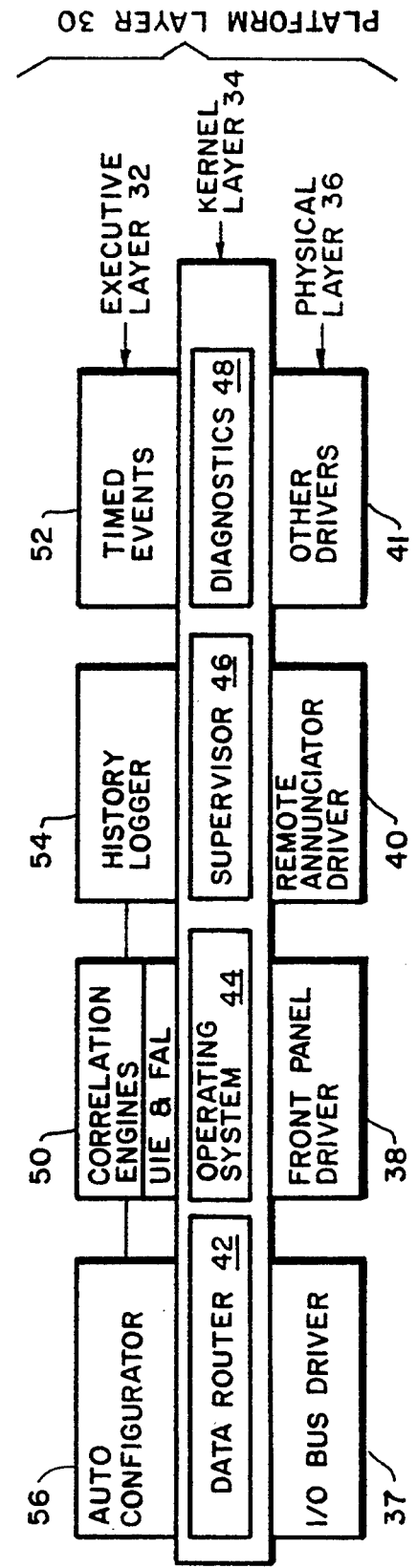
FIG. 2 is a block diagram depicting the executive, kernel and physical layers of the platform layer according to the present invention.

As shown in FIG. 2, the platform layer 30 includes three sub-layers, i.e., an executive layer 32, a kernel layer 34, and a physical layer 36. Physical layer 36 contains all the software which drives the hardware and interfaces to specific hardware components; for example, components of a fire alarm system. Physical layer 36 may include an I/O bus driver 38, a front panel driver 40 and a remote annunciator driver 42. In general, all interfaces to the outside world in the fire alarm system are done through software that resides in the physical layer.

Kernel layer 34 contains standard software system services which monitor or control the fire alarm system. These include data router 42, operating system 44, supervisor 46 and diagnostics 48. Data router 42 provides a messaging facility so that various software subsystems can send messages back and forth between each other. So, for example, when I/O bus driver 36 detects a change in status in the alarm or receiving circuit on the I ZO bus, it sends a message to data router 42 which delivers that message to one of the other units which will process the information. Operating system 44 can be any commercially available or customized operating system which provides various minimum services required by the system software. Supervisor 46 is an important programming unit provided by kernel layer 34. It is essentially a passive unit which is continuously monitoring the performance of the other portions of software and hardware of the system to make sure that they are functioning properly. If there is any problem with any of the other software modules, including I/O bus driver 36, front panel driver 38, data router 42 or correlation engines 50, supervisor 46 will provide diagnostics 48 or error information that is useful to a service person, as well as to identify the severity of the problem.

Executive layer 32, seen in FIG. 2, contains the programming that actually controls the way the fire alarm system will respond to the various inputs and what outputs will be controlled on the system. The key to executive layer 32 is the programming unit designated correlation engines 50. Correlation engines 50 provide different specific functions to the basic system board 2 (FIG. 3). In particular, correlation engines 50 contains the interpreter that processes the product layer code which identifies, for example, how the system will operate in response to an alarm and identifies what signal will be turned on or what relays will be activated, and so on. Executive layer 32 also includes a timed events unit 52, which contains various timers that can be used by the product to perform signal silence operations, history logger 54 and autoconfigurator 56.

Autoconfigurator 56 is actually interpreted in a correlation engine unit 50, seen in FIG. 2, called the user interface engine (UIE). The key to this autoconfigurator is that it interprets, i.e., it takes information from all the units that identify what hardware is on the system and from that sends messages to other units to help them create the programming to respond to the various units.

The UIE is responsible for running the operator interface on the LCD/keypad unit 60 (FIG. 4); also generating output to the printer 62 and associated activities like managing display or print queues. Interface circuits 64 and 66 respectively connect with the LCD/keypad unit 60 and the LED on panel 3.

Figure 4:
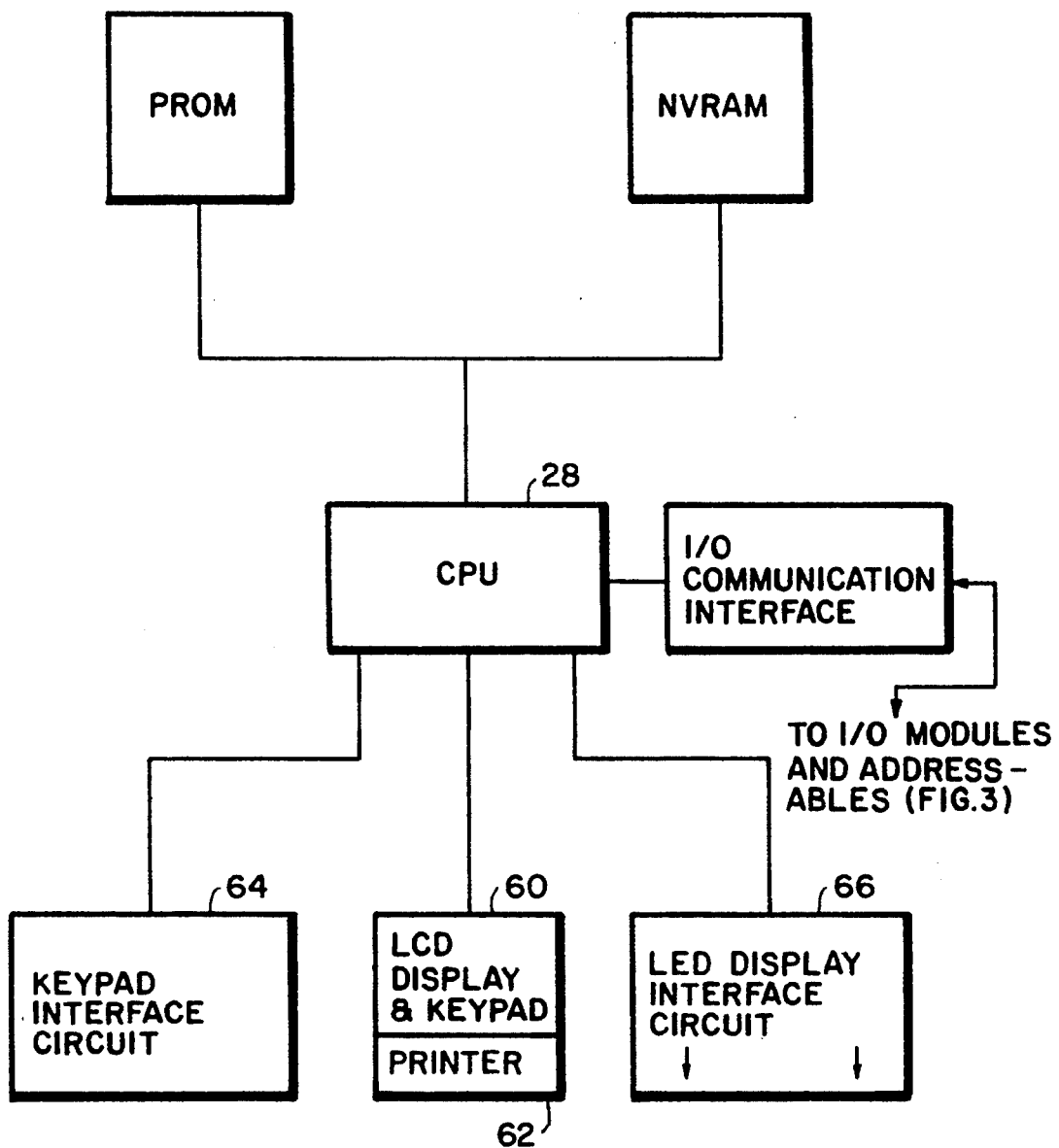
FIG. 4 is a block diagram of the central processor unit (CPU) and associated components forming part of the system.

The autoconfigurator 56 runs the user interface that is used to configure the system from the shared display unit or the service console. It relies on services provided by the UIE for use of the LCD/keypad unit 60 (FIG. 4). The FAC (Fire Alarm Correlation) unit forming part of the correlation engine 50 is configured by an exchange of messages via the data router 42. The UIE is also configured in a fashion that is conceptually similar, but implemented by service words and a messaging interface. This allows another unit to configure both the FAC and UIE.

The FAC is the correlation engine that processes all inputs from the front panel switches, system troubles and the I/O bus 29 (FIG. 3). It generates outputs as required to the I/O bus driver 36, front panel driver 38, and remote annunciator driver 40 FIG. 2. An obvious example is input from alarm circuits that result in outputs to signal and auxiliary circuits. The FAC also turns on and off paging circuits, telephones, processes troubles from II/O bus modules, etc. and drives other operator outputs like LEDs and the operator alert buzzer.

Referring now to FIG. 5, autoconfigurator 56, through specific computer means of the present invention, performs a unique set of operational or process steps and accordingly, the autoconfigurator is seen as preferably comprising: means 99 for receiving inputs relating to the number of modules of the system; means 100 for sending messages to an I/O bus means 101 and instructing I/O bus means 101 to compare the actual number of modules against the number modules input into the system; means 102 for receiving messages from I/O bus means 101 relating to module types connected thereto and developing an I/O map 101 of all the modules on I/O bus means 101; means 104 for storing I/O map 101 as an AC map, the AC map containing information relating to module addresses and module types; means 106 for looking up data from FAC table 107, containing information relating to module types, processing UIE table 109, from the information on the AC map, and sending data from the FAC and UIE tables via a data router to other un its of the open system architecture; means 108 for configuring a front panel LED map 111 of the system from the data from the FAC and UIE tables; means 110 for requesting data from the front panel LED map 111; means 112 for looking up data from front panel LED map 111, and sending messages to FAC table 107; and means 114 for verifying data in the AC map.

When input 99 is received from a service console, the autoconfigurator also includes means 118 for re-mapping zone LED data for the service console, and means 120 for sending LED data and instructions to FAC table 107.

Simply stated, the autoconfigurator sends a message to the I/O bus driver 36 which is responsible for all the modules on the I/O bus 29 and it instructs the I/O bus driver to automatically configure against the number of modules which the operator has entered into the service console or shared display unit. That is, the I/O bus determines (see operational step or means 101) how many modules are connected thereto and if that number matches the number which the operator entered, then the autoconfigurator instructs the I/O bus driver to poll each module on the I/O bus to determine its type, e.g., an alarm, supervisor monitor, etc. The I/O bus then prepares an I/O map 103 containing information relating all the modules connected to the I/O bus, e.g., module addresses and types.

The information contained in the I/O map is then transferred to the autoconfigurator 56 which creates an autoconfiguring (AC) map. See operational step or means 104. With this information the autoconfigurator will know what information to send to the other open system architecture units. That is, the autoconfigurator gathers information from the lower level driver (FIG. 2), which is the physical layer information, and compares that information against FAC tables 107 which provide information capable of interpreting the information on the AC map. Thereafter, the autoconfigurator begins to modify UIE and FAC tables. See block 109 in FIG. 5. Once the autoconfigurator has modified the UIE table, it instructs other units to automatically configure based on the UIE table.

The resulting operational steps, and means therefor, involved in the automatic configuration are seen following step 106; i.e., steps 108, 112, 114, 118, and 120, as well as the step 111 of forming the front panel LED map and the decisional or YES-NO step 116.

While we have shown and described several embodiments in accordance with our invention, it is to be clearly understood that the same are susceptible to numerous changes apparent to one skilled in the art. Therefore, we do not wish to be limited to the details shown and described but intend to show all changes and modifications which come within the scope of the appended claims.

What is claimed is:

1. A system, having a program menu, for monitoring fire alarm events and automatically configuring itself responsive to changes in system hardware comprising:
   a plurality of I/O modules for monitoring said fire alarm events, including a plurality of input circuits for detecting and responding to said fire alarm events, and a plurality of output circuits for indicating the presence of said fire alarm events;
   an I/O bus and a microcontroller, including an I/O bus driver, connected to said I/O modules;
   a computer means for responding to said fire alarm events, including means for storing an internal program, said microcontroller being connected to said computer means, and to said input circuits for two-way communication with said input circuits, and further connected to said output circuits;
   a front panel connected in said system, and means at said front panel for further indicating said fire alarm events for at least one-way communication with said output circuits; and
   means, within said computer means, for automatically configuring the system responsive to changes in the quantity of said I/O modules connected to the system hardware throughout the operation of the system, including means for selecting the automatically configuring function from the system program menu after said changes have been made, and means, responsive to said means for automatically configuring, for updating said internal program to take into account the changes made in system hardware, said means for updating comprising:
   means for receiving inputs relating to the number of said I/O modules in the system;
   means for sending messages to said I/O bus instructing said I/O bus driver to compare the actual number of said I/O modules against said received inputs;
   means, including the I/O bus, for receiving said messages and for developing an I/O map identifying module locations and module types of said I/O modules on said I/O bus;
   means for storing said module locations and said module types of said I/O map within an autoconfiguring map, said autoconfiguring map containing autoconfiguring information;
   means for looking up data from tables containing information relating to said modules types and updating said autoconfiguring information of said autoconfiguring map based on said data; and
   means for relaying said autoconfiguring information to said internal program.

2. A system, having a program menu, for monitoring fire alarm events and automatically configuring itself responsive to changes in system hardware comprising:
   a plurality of I/O modules for monitoring said fire alarm events, including a plurality of input circuits for detecting and responding to said fire alarm events, and a plurality of output circuits for indicating the presence of said fire alarm events;

an I/O bus and a microcontroller, including an I/O bus driver, connected to said I/O modules;

a computer means for responding to said fire alarm events, including means for storing an internal program, said microcontroller being connected to said computer means, and to said input circuits for two-way communication with said input circuits, and further connected to said output circuits;

a front panel connected in said system, and means at said front panel for further indicating said fire alarm events for at least one-way communication with said output circuits; and means, within said computer means, for automatically configuring the system responsive to changes in the quantity of said I/O modules connected to the system hardware throughout the operation of the system, including means for selecting the automatically configuring function from the system program menu after said changes have been made, and means, responsive to said means for automatically configuring, for updating said internal program to take into account the changes made in system hardware, said means for updating comprising:

means for receiving inputs relating to the number of said I/O modules in the system;

means for sending messages to said I/O bus instructing said for bus driver to compare the actual number of said I/O modules against said received inputs;

means, including the I/O bus, for receiving said messages and for developing an I/O map identifying module locations and module types of said I/O modules on said I/O bus;

means for storing said module locations and said module types of said I/O map within an autoconfiguring map, said autoconfiguring map containing autoconfiguring information;

means for looking up data from tables containing information relating to said modules types and updating said autoconfiguring information of said autoconfiguring map based on said data; and means for relaying said autoconfiguring information to said internal program;

wherein said means for automatically configuring includes means for configuring said front panel of said system, means for verifying data in said autoconfiguring map and means for remapping zone and LED data for a service console.

* * * * *